(12) United States Patent
Park

(10) Patent No.: US 10,976,532 B2
(45) Date of Patent: Apr. 13, 2021

(54) STRUCTURED ILLUMINATION MICROSCOPY SYSTEM USING DIGITAL MICROMIRROR DEVICE AND TIME-COMPLEX STRUCTURED ILLUMINATION, AND OPERATION METHOD THEREFOR

(71) Applicants: TOMOCUBE, INC., Daejeon (KR); KOREA ADVANCED INSTITUTE OF SCIENCE AND TECHNOLOGY, Daejeon (KR)

(72) Inventor: YongKeun Park, Daejeon (KR)

(73) Assignees: Tomocube, Inc., South Korea (KR); Korea Advanced Institute of Science and Technology, South Korea (KR)

( * ) Notice: Subject to any disclaimer, the term of this patent is extended or adjusted under 35 U.S.C. 154(b) by 0 days.

(21) Appl. No.: 16/308,329

(22) PCT Filed: Jun. 9, 2017

(86) PCT No.: PCT/KR2017/006034
§ 371 (c)(1),
(2) Date: Dec. 7, 2018

(87) PCT Pub. No.: WO2017/213464
PCT Pub. Date: Dec. 14, 2017

(65) Prior Publication Data
US 2020/0081236 A1   Mar. 12, 2020

(30) Foreign Application Priority Data

Jun. 10, 2016 (KR) .................. 10-2016-0072304
Nov. 17, 2016 (KR) .................. 10-2016-0153420
Jan. 6, 2017 (KR) .................. 10-2017-0002524

(51) Int. Cl.
*G02B 21/00* (2006.01)
*H04N 13/365* (2018.01)
(Continued)

(52) U.S. Cl.
CPC ..... *G02B 21/0048* (2013.01); *G02B 21/0032* (2013.01); *G02B 21/0056* (2013.01);
(Continued)

(58) Field of Classification Search
CPC ............ G02B 21/0048; G02B 21/0032; G02B 21/0056; G02B 21/0076; G02B 21/0084;
(Continued)

(56) References Cited

U.S. PATENT DOCUMENTS

2014/0133016 A1* 5/2014 Matsuura ............. G02B 21/088
                                                                359/385
2014/0291484 A1  10/2014 Kalkbrenner et al.
(Continued)

FOREIGN PATENT DOCUMENTS

CN    102540412    7/2012
JP    2001 521205  11/2001
(Continued)

OTHER PUBLICATIONS

Dan et al., "DMD-based LED-Illumination Super-Resolution and Optical Sectioning Microscopy," Scientific Reports, vol. 3, Jan. 2013, 7 pages.
(Continued)

*Primary Examiner* — Alexander Gee
(74) *Attorney, Agent, or Firm* — Fish & Richardson P.C.

(57) ABSTRACT

Presented are a structured illumination microscopy system using a digital micromirror device and a time-complex structured illumination, and an operation method therefor. A structured illumination microscopy system using a digital micromirror device and a time-complex structured illumi-
(Continued)

nation according to an embodiment may comprise: a light source; a digital micromirror device (DMD) for receiving light irradiated from the light source, implementing a time-complex structured illumination, and causing a controlled structured illumination to enter a sample; and a fluorescence image measurement unit for extracting a high-resolution 3D fluorescence image of the sample.

16 Claims, 8 Drawing Sheets

(51) Int. Cl.
| | | |
|---|---|---|
| *G02B 21/26* | (2006.01) | |
| *G02B 21/36* | (2006.01) | |
| *G06T 3/40* | (2006.01) | |
| *G06T 11/00* | (2006.01) | |
| *G02B 26/08* | (2006.01) | |
| *G02B 21/06* | (2006.01) | |
| *G01N 21/17* | (2006.01) | |
| *G01N 21/45* | (2006.01) | |
| *G01B 9/02* | (2006.01) | |
| *G02B 6/32* | (2006.01) | |
| *G02B 6/35* | (2006.01) | |
| *G01N 21/64* | (2006.01) | |

(52) U.S. Cl.
CPC ..... *G02B 21/0076* (2013.01); *G02B 21/0084* (2013.01); *G02B 21/26* (2013.01); *G02B 21/367* (2013.01); *G06T 3/4053* (2013.01); *G06T 11/003* (2013.01); *H04N 13/365* (2018.05)

(58) Field of Classification Search
CPC .... G02B 21/26; G02B 21/367; H04N 13/365; H04N 13/214; H04N 13/218; G06T 3/4053; G06T 11/003; G01N 21/359; G01N 21/6428
See application file for complete search history.

(56) References Cited

U.S. PATENT DOCUMENTS

2016/0299033 A1* 10/2016 Choi .................. G01M 11/33
2017/0254996 A1*  9/2017 Lee ................... G02B 21/0032

FOREIGN PATENT DOCUMENTS

| KR | 100913508 | 8/2009 |
|---|---|---|
| KR | 20100018984 | 2/2010 |
| KR | 20150069176 | 6/2015 |
| KR | 20160017299 | 2/2016 |

OTHER PUBLICATIONS

Sustafsson, "Nonlinear Structured-Illumination Microscopy: Wide-Field Fluorescene Imaging with Theoretically Unlimited Resolution," Proceedings of the National Academy of Sciences of the United States of America, vol. 102, No. 37, Jul. 2005, 6 pages.

Gustafsson, "Surpassing the Lateral Resolution Limit by a Factor of Two using Structured Illumination Microscopy," Journal of Microscopy, vol. 128, No. 2, 2000, 6 pages.

Lee, "Binary Computer-Generated Holograms," Applied Optics, vol. 18, No. 21, Nov. 1979, 9 pages.

\* cited by examiner

STRUCTURED ILLUMINATION MICROSCOPY SYSTEM USING DIGITAL MICROMIRROR DEVICE AND TIME-COMPLEX STRUCTURED ILLUMINATION, AND OPERATION METHOD THEREFOR

CROSS REFERENCE TO RELATED APPLICATIONS

This application is a U.S. National Phase Application under 35 U.S.C. § 371 of International Application PCT/KR2017/006034, filed on Jun. 9, 2017, which claims the benefit of Korean Application No. 10-2016-0072304, filed on Jun. 10, 2016, Korean Application No. 10-2016-0153420, filed on Nov. 17, 2016, and Korean Application No. 10-2017-0002524, filed on Jan. 6, 2017, the entire contents of which are hereby incorporated by reference in their entireties.

TECHNICAL FIELD

The following embodiments relate to a structured illumination microscopy system using a digital micromirror device and a time-complex structured illumination, and an operation method therefor.

BACKGROUND ART

In order to obtain a fluorescence image of a cell, a fluorescent protein is expressed in a specific organ (molecule) of the cell or dye is attached thereto. If an excitation light source is incident into the expressed fluorescence material, the fluorescent protein emits a fluorescence signal of another wavelength after absorbing the excitation light source. An image of an inner structure of a cell may be distinguished and measured through the fluorescence signal.

Recently, a structured illumination microscopy is applied to a method of increasing the resolution of a fluorescence image. The structured illumination microscopy is a method of obtaining an image of an ultrahigh-resolution, which exceeds the value of a diffraction limit by making an excitation light source incident onto a cell with a specific pattern and measuring a signal that is beyond an optically measurable range.

At first, the structured illumination microscopy forms a pattern by allowing a light to pass through a diffraction lattice to obtain an image (non-patent documents 1 and 2). The structured illumination microscopy may measure an image from various patterns while rotating and horizontally moving a lattice pattern and may obtain an image of a high resolution from the image of a low resolution through the algorithm. Recently, it is possible to improve the resolution by using the nonlinear structured illumination microscopy (non-patent document 3).

In addition, a method of obtaining a 3D fluorescence image through the optical sectioning using a digital micromirror device (DMD) based on the patterned low coherent light and the z-axis shift stage has also been suggested (non-patent documents 4 and 5).

However, a technique using a physical diffraction lattice (non-patent document 2) has a disadvantage in that vibration and speed limitation are generated and the diffraction lattice pattern cannot be changed because the diffraction lattice pattern has to be mechanically moved. In addition, since a technique using a conventional digital micromirror device (DMD) (non-patent document 4) is a method of inputting a binary pattern into a digital micromirror device (DMD), an incoherent light source such as an LED is required to generate a sinusoidal pattern so that it is impossible to make high-speed measurement. When using a coherent light source such as a laser to increase the speed, an undesired noise pattern occurs due to the diffraction that occurs in the binary pattern, so that the image analysis is impossible.

RELATED DOCUMENTS (Non-Patent Document 1) Gustafsson, M. G. (2000). "Surpassing the lateral resolution limit by a factor of two using structured illumination microscopy" Journal of microscopy 198 (2): 82-87.

(Non-Patent Document 2) Kalkbrenner, T., et al. (2014). Microscope with structured illumination, US Patent 20,140, 291,484.

(Non-Patent Document 3) Gustafsson, M. G. (2005). "Nonlinear structured-illumination microscopy: wide-field fluorescence imaging with theoretically unlimited resolution". Proceedings of the National Academy of Sciences of the United States of America 102 (37): 13081-130812.

(Non-Patent Document 4), et al. (2011). High-speed structure illumination optical microscopy system and method based on digital micromirror device, China Patent CN10254041212A.

(Non-Patent Document 5) Dan, D., et al. (2013). "DMD-based LED-illumination Super-resolution and optical sectioning microscopy" Scientific reports 3.

(Non-Patent Document 12) Lee, W.-H. (1979). "Binary computer-generated holograms" Applied Optics 18 (21): 312121-312129.

DISCLOSURE

Technical Problem

Embodiments provide a structured illumination microscopy system using a digital micromirror device (DMD) and a time-complex structured illumination, and an operation method therefor, capable of implementing the time-complex structured illumination by using the digital micromirror device and extracting a high-resolution 3D fluorescence image by using the time-complex structured illumination.

In addition, embodiments provide an ultrahigh-speed 3D refractive index tomography and structured illumination microscopy system using a wavefront shaper, which optically measures a 3D refractive index distribution in a living cell and a cellular tissue and simultaneously distinguishes a specific inner structure labeled by a fluorescent protein, and a method using the same.

In addition, embodiments provide an ultrahigh-speed 3D refractive index tomography and a method thereof using a digital micromirror device, which can generate a continuous structured illumination having deeper bits by utilizing the digital micromirror device so that a variety of accurate incident lights can be generated without noise, thereby acquiring a tomographic image having an improved quality.

Technical Solution

A structured illumination microscopy system using a digital micromirror device and a time-complex structured illumination according to an embodiment includes a light source; a digital micromirror device (DMD) that receives light irradiated from the light source and implements a time-complex structured illumination to cause a controlled structured illumination to enter a sample; and a fluorescence image measurement unit for extracting a high-resolution 3D fluorescence image of the sample.

The light source may include a laser for emitting a laser beam.

The digital micromirror device may provide a time-complex pattern, which is controlled to operate with a high coherent light source, to the sample.

The digital micromirror device may implement a time-complex structured illumination of a sinusoidal pattern to obtain an ultrahigh-resolution image by introducing a plane wave into a specific pattern and adjusting a phase between plane waves constituting the pattern.

The digital micromirror device may control a phase or a pattern of a wavefront of a plane wave incident from the light source, and the fluorescence image measurement unit may acquire a plurality of fluorescence images as the phase or the pattern of the wavefront of the plane wave is controlled to obtain a high-resolution 3D fluorescence image.

The fluorescence image measurement unit may obtain a plurality of fluorescence images by controlled patterns, reconstruct an ultrahigh-resolution 2D fluorescence image through an algorithm of the plurality of fluorescence images, move a stage or a lens in a z-axis direction by using a low coherent characteristic of fluorescence, and obtain a high-resolution 3D image by measuring each part on a z-axis of the sample.

An operation method for a structured illumination microscopy system using a digital micromirror device and a time-complex structured illumination according to another embodiment includes: irradiating a digital micromirror device (DMD) with a light emitted from a light source; implementing a time-complex structured illumination through the digital micromirror device to cause a controlled structured illumination to enter a sample; and extracting a high-resolution 3D fluorescence image of the sample.

The light source may include a laser for irradiating a laser beam.

The implementing of the time-complex structured illumination through the digital micromirror device to cause the controlled structured illumination to enter the sample may include providing the sample with a time-complex pattern that is controlled to operate with a high coherent light source.

The implementing of the time-complex structured illumination through the digital micromirror device to cause the controlled structured illumination to enter the sample may include implementing a time-complex structured illumination of a sinusoidal pattern to obtain an ultrahigh-resolution image by introducing a plane wave into a specific pattern and adjusting a phase between plane waves constituting the pattern.

The implementing of the time-complex structured illumination through the digital micromirror device to cause the controlled structured illumination to enter the sample may include expressing a bit depth using a time integration method by moving the digital micromirror device at a predetermined speed when a shutter of a camera is open for measurement, and implementing a controlled time-complex structured illumination of continuous patterns through 1-bit digital operation.

The extracting of the high-resolution 3D fluorescence image of the sample may include: obtaining a plurality of fluorescence images by controlled patterns; reconstructing an ultrahigh-resolution 2D fluorescence image through an algorithm of the plurality of fluorescence images; and moving a stage or a lens in a z-axis direction by using a low coherent characteristic of fluorescence, and obtaining a high-resolution 3D image by measuring each part of on a z-axis of the sample.

Advantageous Effects

According to embodiments, it is possible to provide a structured illumination microscopy system using a digital micromirror device (DMD) and time-complex structured illumination, and an operation method therefor, capable of implementing the time-complex structured illumination by using the digital micromirror device and extracting a high-resolution 3D fluorescence image by using the time-complex structured illumination.

BEST MODE

Hereinafter, embodiments of the inventive concept will be described with reference to accompanying drawings. However, embodiments to be described may be modified in the different forms, and the scope and spirit of the inventive concept is not limited by the embodiments to be described below. In addition, various embodiments are provided to describe this disclosure more fully to those skilled in the art. For a clear description, forms, sizes, and the like of elements may be exaggerated in a drawing.

To three-dimensionally analyze an inner structure of a cell and to measure the change in a structure in real time may be a technology that greatly contributes to the biological and pathological studies. Embodiments to be described below may provide a technology that is capable of measuring a high-resolution 3D fluorescence image of a cell by using a digital micromirror device (DMD) and, in more detail, may provide a system capable of implementing the time-complex structured illumination using the digital micromirror device (DMD) and extracting a high-resolution 3D fluorescence image using the time-complex structured illumination. In other words, the embodiments suggest a time-complex structured illumination method to provide a method of analyzing a sample by introducing a structured light pattern onto the sample, and a system capable of extracting a high-resolution 3D fluorescence image using the same.

Each pixel of the digital micromirror device (DMD) is only capable of performing 1-bit digital operation in an on/off manner, making it difficult to accurately express a desired incident light. In other words, a desired pattern of the incident light is continuous in a space, but the digital micromirror device (DMD) can only express in an on or off manner, thereby inevitably inducing an undesired incident light. For this reason, undesired diffraction patterns are incident onto the sample, thereby causing noise.

In this regard, a structured incident light is provided by utilizing a time integration method to solve the problem of inaccuracies that are inevitably caused by the digital micromirror device which only can perform the on/off type 1-bit digital operation. The structured illumination microscopy system using the digital micromirror device and the time-complex structured illumination according to an embodiment and the operation method therefor can generate continuous structured incident lights by using the digital micromirror device, and can obtain a 3D fluorescence image by utilizing the structured incident lights.

Figure 1:
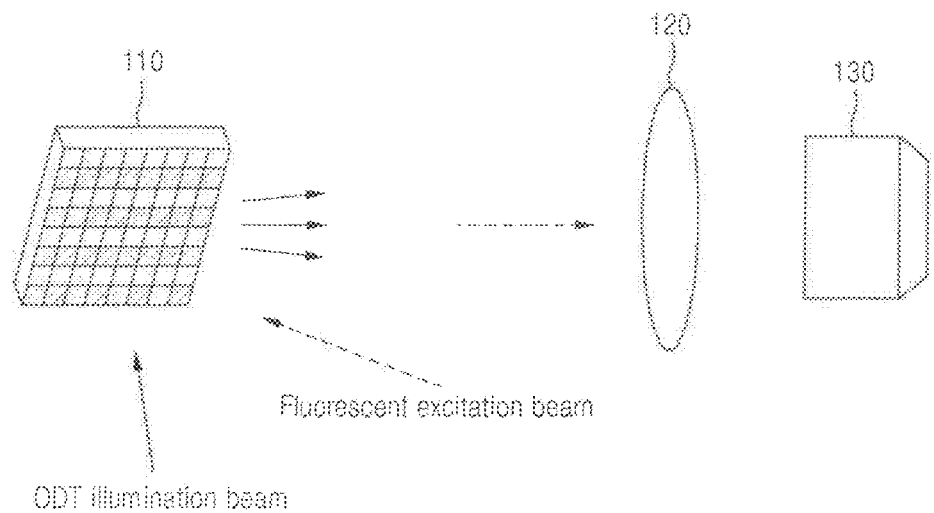
FIG. 1 is a view for describing a structured illumination microscopy system according to an embodiment.

FIG. 1 is a view for describing a structured illumination microscopy system according to an embodiment.

Referring to FIG. 1, one system that measures a high-resolution 3D fluorescence image by using a wavefront shaper is illustrated as an example to explain the structured illumination microscopy system according to one embodiment.

The structured illumination microscopy requires to control the phase and pattern of an incident wavefront. When the wavefront shaper is used, the incident angle of the plane wave can be controlled and the phase and pattern of the wavefront of the plane wave can be controlled. The wavefront shaper may be a digital micromirror device (DMD). One example of the structured illumination microscopy system will be described below in more detail.

The structured illumination microscopy system using the digital micromirror device and the time-complex structured illumination according to an embodiment may include a light source, a modulation unit, an interferometer, and a fluorescence image measurement unit.

The light source may irradiate a sample with light. A laser may be used as the light source, and the light source can irradiate a sample such as a cell to be measured with the laser beam.

The modulation unit may transmit an incident angle onto the sample (specimen) by changing at least one of the irradiation angle and the wavefront pattern of the incident light by using a wavefront shaper 110. For example, the modulation unit may include the wavefront shaper 110, a tube lens 120, and a condenser lens 130. In addition, according to an embodiment, the modulation unit may further include a spatial filter.

The wavefront shaper 110 may be a device capable of controlling the phase of light or a fixed film in which the phase of the fixed film can be controlled. For example, the wavefront shaper may include a digital micromirror device (DMD). That is, the digital micromirror device may be a wavefront shaper and may include an array having a plurality of micromirrors.

The tube lens 120 and the condenser lens 130 may make a plane wave incident onto the sample by increasing the progression angle of the plane wave.

In this case, the sample may be an object to be measured, may be a cell, bacteria, a microbe, or the like, and may be a target including a cell or the like.

Furthermore, the interferometer may measure a 2D optical field, which passes through the sample, based on at least one incident light.

The fluorescence image measurement unit may obtain a high-resolution 3D fluorescence image by controlling the phase and pattern of the wavefront of the plane wave.

Meanwhile, a 3D refractive index image may be obtained using the structured illumination microscopy system including the digital micromirror device and the time-complex structured illumination according to an embodiment. In order to obtain the refractive index distribution in the 3D refractive tomography, a sample image a sample image generated by plane waves of various angles is required.

In other words, the structured illumination microscopy system using the digital micromirror device and the time-complex structured illumination according to an embodiment may further include a refractive index imaging unit. The refractive index imaging unit may acquire a 3D refractive index image through information of the measured 2D optical field. Accordingly, it is possible to acquire the high-resolution 3D fluorescence image of the sample using the wavefront shaper, and simultaneously measure a 3D refractive index stereoscopic image.

In order to obtain a 3D refractive index tomogram, the system may just the irradiation angle of an incident plane wave by using the wavefront shaper through a Lee Hologram method (non-patent document 12). For example, the wavefront shaper may include the digital micromirror device (DMD). In order to adjust a progression angle of an incident plane wave, the system may properly change the Lee hologram pattern displayed on the digital micromirror device.

More specifically, in order to form plane waves of various progression angles by using the digital micromirror device, the Lee hologram pattern, which is expressed as Equation 1, may be input to the digital micromirror device.

$$f(x, y) = \frac{1}{2}[1 + \cos\{2\pi ux + 2\pi vy + \phi(x, y)\}] = \quad \text{[Equation 1]}$$
$$\frac{1}{2} + \frac{1}{4}\exp[j2\pi(ux + vy)]\exp[j\phi(x, y)] +$$
$$\frac{1}{4}\exp[-j2\pi(ux + vy)]\exp[-j\phi(x, y)].$$

In this case, each of 'u' and 'v' may be a spatial frequency and may be a value that is adjusted through a pixel in the digital micromirror device and φ may denote the relative phase difference of a plane wave.

In the second equation of Equation 1, if the system makes only a diffraction light, which corresponds to the second of three terms, incident onto the sample and shields the rest thereof, it may adjust the progression direction of one plane wave.

In the case where an optical axis designated as z-axis and where angles of x-axis and y-axis directions of a laser plane wave having a specific wavelength λ are respectively designated as $\theta_x$ and $\theta_y$, phase information of the wavefront corresponding thereto may be expressed as follows.

$$\phi(x, y) = \frac{2\pi}{\lambda}\{x \sin\theta_x + y \sin\theta_y\} \quad \text{[Equation 2]}$$

Accordingly, if the system adjusts the pattern of the digital micromirror device in Equation 1, it may obtain desired phase information by using Equation 2. In this case, in order to use one reflected light, the system may use only one of diffraction lights generated by the digital micromirror device through a spatial filter.

The system may create an interference pattern between the 2D optical field, which passes through the sample, and a reference beam, and may measure an optical field while variously changing the irradiation angle of the plane wave. The system may obtain the 3D refractive index image from information of the measured 2D optical field by using an optical diffraction tomography or a filtered back projection algorithm.

Hereinafter, a method for obtaining an ultrahigh-resolution fluorescence image using a structured illumination microscopy will be described.

To obtain an ultrahigh-resolution image in a structured illumination microscopy, the system may make the specific pattern incident on the sample and may adjust a phase between plane waves constituting the pattern.

For example, a sinusoidal pattern may be expressed as follows.

$$f(x, y) = \frac{1}{2} + \frac{1}{4} \exp [j2\pi(ux+vy)] \exp [j\phi(x,y)] + \frac{1}{4} \exp [-j2\pi(ux+vy)] \exp [-j\phi(x,y)] \quad \text{Equation 3}$$

In this case, as described above, each of 'u' and 'v' may be a spatial frequency and may be a value that is adjusted through a pixel in the digital micromirror device and φ may denote the relative phase difference of the plane wave and may be adjusted through the pattern form of the digital micromirror device.

Figure 2A:
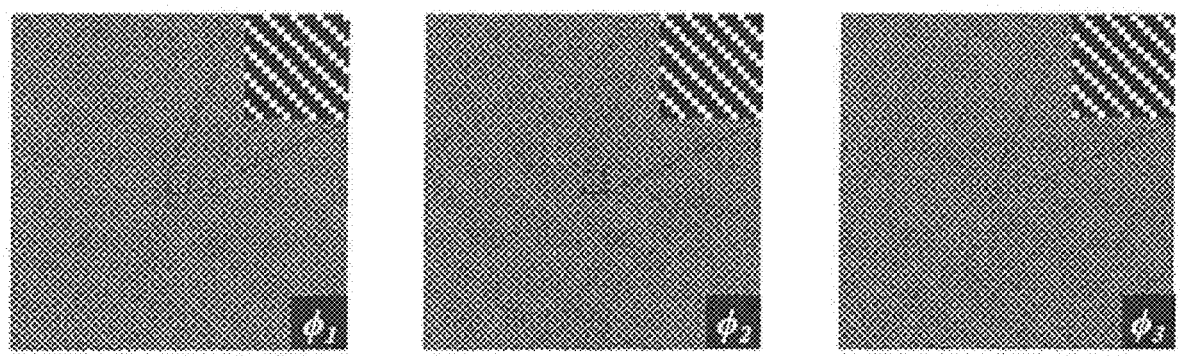
FIG. 2a is a view for describing a relative phase difference of a plane wave according to an embodiment.

FIG. 2a is a view for describing a relative phase difference of a plane wave according to an embodiment. Referring to FIG. 2a, the relative phase difference φ of a plane wave may be adjusted through the pattern form of the digital micromirror device. In a 3D refractive index tomography, only the second of three terms in Equation 1 or 3 was used, but all the three terms may be used in a structured illumination microscopy.

In this case, a phase shifting method may be used to distinguish the optical fields on the three terms constituting the incident sinusoidal pattern and relative phase difference φ may be controlled to another value that is greater than or equal to a value of three steps.

Figure 2B:
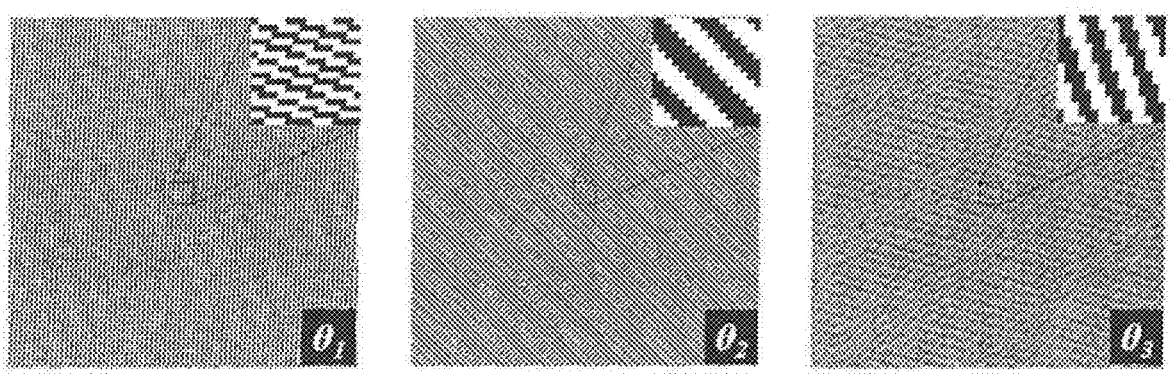
FIG. 2b view for describing adjusting of a spatial frequency according to an embodiment.

FIG. 2b is a view for describing adjusting of a spatial frequency according to an embodiment. Referring to FIG. 2b, in order to maintain the azimuthal symmetry of the resolution, the system may measure various azimuthal angles θ by adjusting a spatial frequency while rotating the direction of the sinusoidal pattern.

That is, total 'N*M' patterns are needed due to 'N' patterns for distinguishing the optical field and 'M' patterns for azimuthal angle scanning. The angles and the phases of the patterns may be adjusted through the pattern of the digital micromirror device.

In this case, if the number of pixels of the digital micromirror is Λ, the phase φ is adjusted to the step of 2π/Λ.

Figure 3:
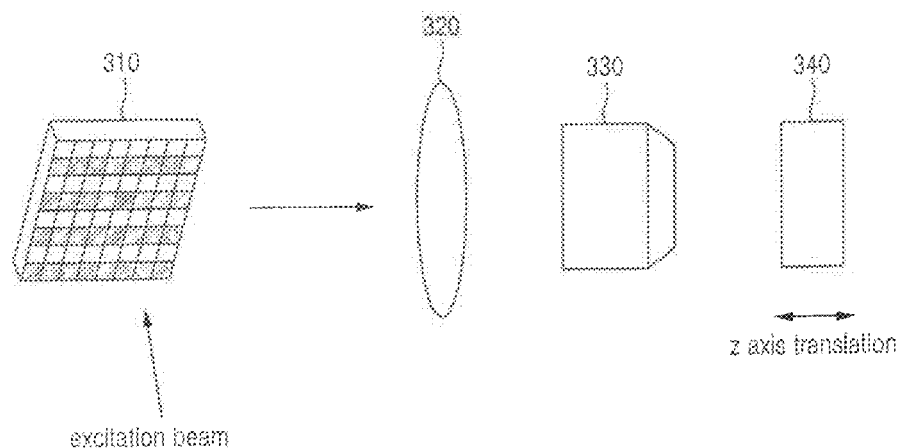
FIG. 3 is a view for describing a method of obtaining a 3D ultrahigh-resolution fluorescence image according to an embodiment.

FIG. 3 is a view for describing a method of obtaining a 3D ultrahigh-resolution fluorescence image according to an embodiment. Referring to FIG. 3, a fluorescence image can be obtained by controlled patterns and an algorithm can be used to reconstruct an ultrahigh-resolution 2D fluorescence image.

In addition, if the system uses a low coherent light as a light source, after it distinguishes only a specific z-axis portion, it may measure the distinguished portion. If the system measures each z-axis portion of a sample 340 after it translates a stage or a condenser lens 330 in the z-axis direction, it may obtain the ultrahigh-resolution 3D fluorescence image. Meanwhile, as described in FIG. 1, the modulation unit may include a wavefront shaper 310, a tube lens 320, and the condenser lens 330. In addition, according to an embodiment, the modulation unit may further include a spatial filter.

The structured illumination microscopy using the digital micromirror device and the time-complex structured illumination according to one embodiment of the present invention will be described below in more detail.

Hereinafter, a technique for measuring a 3D fluorescence image using a continuous cosine-type structured incident light will be described in more detail.

In one embodiment, a continuous structured incident light may be generated and utilized in a conventional interferometer based holographic imaging system. The continuous structured incident light may include a structured incident light in the form of a continuous cosine.

In this case, the interferometer may be an interferometer generally used for holographic imaging, and may include all kinds of interferometers that can be generally utilized in holographic imaging, such as a Mach-Zehnder interferometer, a Michelson interferometer, a quantitative phase imaging unit, etc.

As an example, a method for measuring a 3D fluorescence image using a continuous cosine-type structured incident light in a holographic imaging system using a Mach-Zehnder interferometer will be described in more detail.

Figure 4:
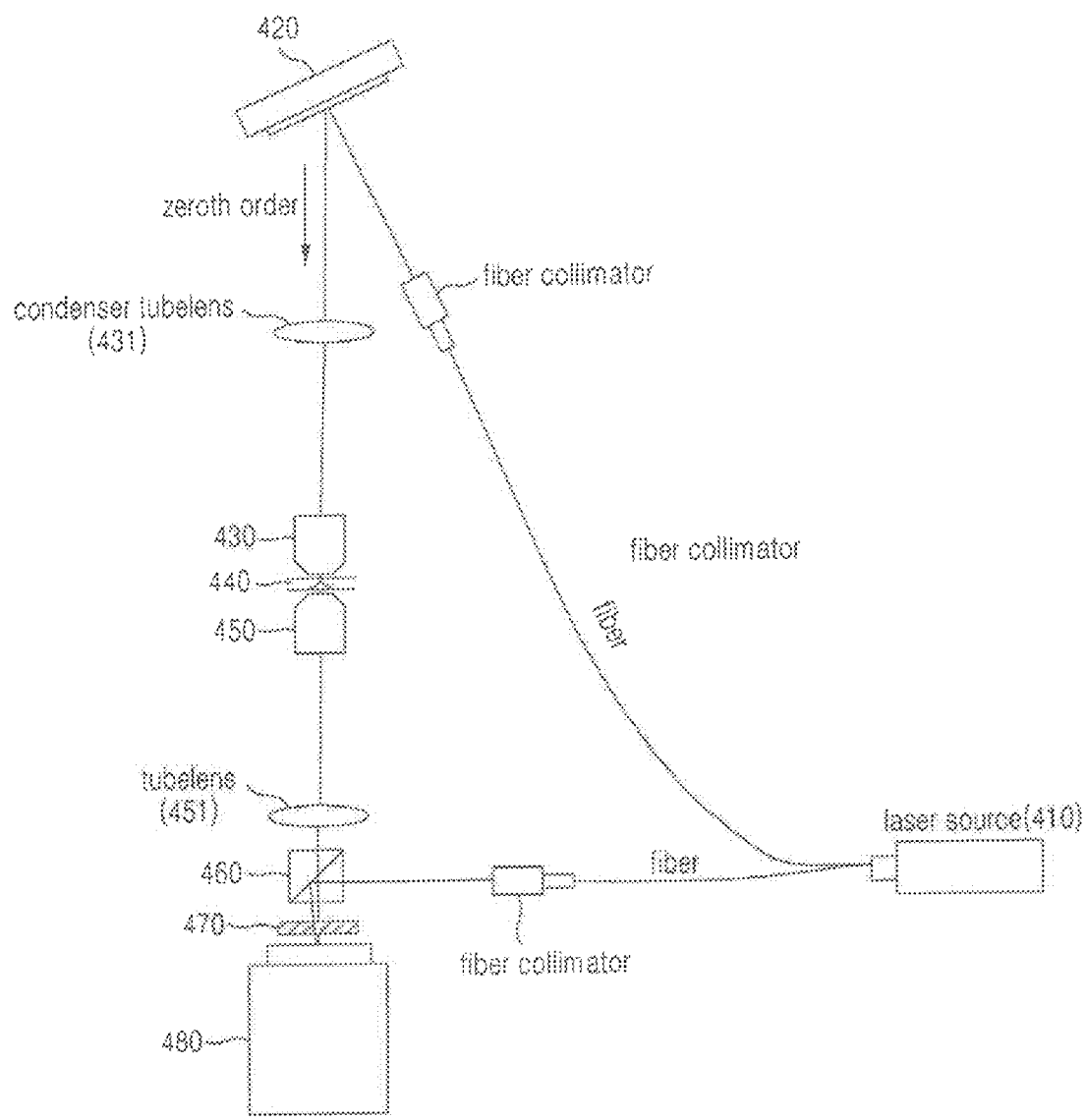
FIG. 4 is a view for describing a structured illumination microscopy system using a digital micromirror device and a time-complex structured illumination according to an embodiment.

FIG. 4 is a view for describing a structured illumination microscopy system using a digital micromirror device and a time-complex structured illumination according to an embodiment.

Referring to FIG. 4, an interferometer-based holographic imaging system can be realized using a structured illumination microscopy system including a digital micromirror device and a time-complex structured illumination according to an embodiment. In this case, a Mach-Zehnder interferometer can be used as the interferometer. Interferometers generally used in holographic imaging can be used in addition to the Mach-Zehnder interferometer.

The structured illumination microscopy system using the digital micromirror device and the time-complex structured illumination according to one embodiment may include a light source 410, a digital micromirror device 420, a condenser lens 430, a focal plane 440, an objective lens 450, and a camera 480. In addition, according to an embodiment, at least one lens, a beam splitter 4120 and a polarizing plate 470 may be further provided.

The structured illumination microscopy system using the digital micromirror device and the time-complex structured illumination according to an embodiment may be included in the structured illumination microscopy system using the digital micromirror device and the time-complex structured illumination according to an embodiment described with reference to FIG. 1. For example, the digital micromirror device 420 may be included in the wavefront shaper 110 to make the light emitted from the light source 410 as a continuous structured incident light.

In this case, a sample 440 to be measured may be disposed between the condenser lens 430 and the objective lens 450. Therefore, the light irradiated from the light source 410 is adjusted using the digital micromirror device 420 and passes through the sample 440 disposed between the condenser lens 430 and the objective lens 450 to measure an image by using a camera 480.

The light source 410 may irradiate the sample 440 with the light.

For example, a laser may be used as a light source, and the light source 410 may irradiate the sample 440 such as a cell to be measured with the laser beam.

The digital micromirror device (DMD) 420 can adjust the light emitted from the light source 410 and can transmit the light onto the sample 440 by changing at least one of the irradiation angle and a wavefront pattern of the incident light.

The condenser lens 430 allows the light emitted from the light source 410 to pass therethrough and is adjustable in the z-axis direction. Accordingly, the best position of the condenser lens 430 can be automatically found by examining the amount of change in the position of the region irradiated with the light according to the height of the condenser lens 430.

The condenser lens 430 is for collecting the light into one spot and is used to concentrate the light on a desired direction and place. In addition, the condenser lens 430 may not only collect the light, but also increase the resolution of an image or refract the light according to the purposes and usages thereof.

That is, the condenser lens 430 may adjust only the brightness by calibrating the focusing, and it is not easy to match the image. Accordingly, the focusing may be calibrated by checking an acquired image.

The objective lens 450 may be spaced apart from the condenser lens 430 by a predetermined distance to allow the light passing through the condenser lens 430 to pass therethrough.

The objective lens 450 is disposed near the sample 440 in the optical system and can be used to form an image of the sample 440. In this case, the objective lens 450 may include a reflective mirror used for the same purpose.

Meanwhile, the focal plane may be formed between the condenser lens 430 and the objective lens 450 to confirm the best focus. In this case, if the focal point is correct, the light can always be irradiated onto the center regardless of the position of the focal plane. The sample 440 may be placed on the focal plane.

The sample 440 is an object to be measured and disposed between the condenser lens 430 and the objective lens 450. For example, the sample may be a cell, a bacterium, a microbe, or the like, and may be an object including the cell or the like.

The camera 480 may be a photographing device that photographs an image passing through the objective lens 450.

In addition, according to an embodiment, at least one lens, a beam splitter 4120 and a polarizing plate 470 may be further provided.

For example, the at least one lens may be a condenser lens tube lens 431 that adjusts the light passing through the digital micromirror device 420 to transmit the light to the condenser lens 430, or may be a tube lens 151 that adjusts the light transmitted to the camera 480 by passing through the objective lens 450.

The beam splitter 4120 allows the light passing through the objective lens 450 to pass through the camera 480 and transmits the light reflected from the camera 480 to the light source 410.

The polarizing plate 470 may be disposed between the beam splitter 4120 and the camera 480.

The structured illumination microscopy using the digital micromirror device and the time-complex structured illumination according to an embodiment may provide a structured illumination microscopy technique, in which a time-complex pattern illumination is incident onto the digital micromirror device (DMD) to operate with a light source having a high coherent such as a laser. Thus, after the precisely controlled structured illumination is incident onto the sample, the measured various fluorescence images are analyzed through the structured illumination microscopy technique to obtain high-resolution 3D fluorescence images of the sample such as a cell or a tissue.

The principle of the structured illumination microscopy technique can be explained based on two techniques. (1) Gray-scaled intensity images are projected to a digital micromirror device (DMD) or a binary intensity modulation unit by using time multiplexing. (2) The structured illumination having a sinusoidal intensity pattern can be composed of three distinct spatial frequencies. The structured illumination microscopy technique according to one embodiment may use a structured illumination microscopy (SIM) having the same physical concept (non-patent document 1). The structured illumination microscopy can be understood as a hologram version.

Figure 5:
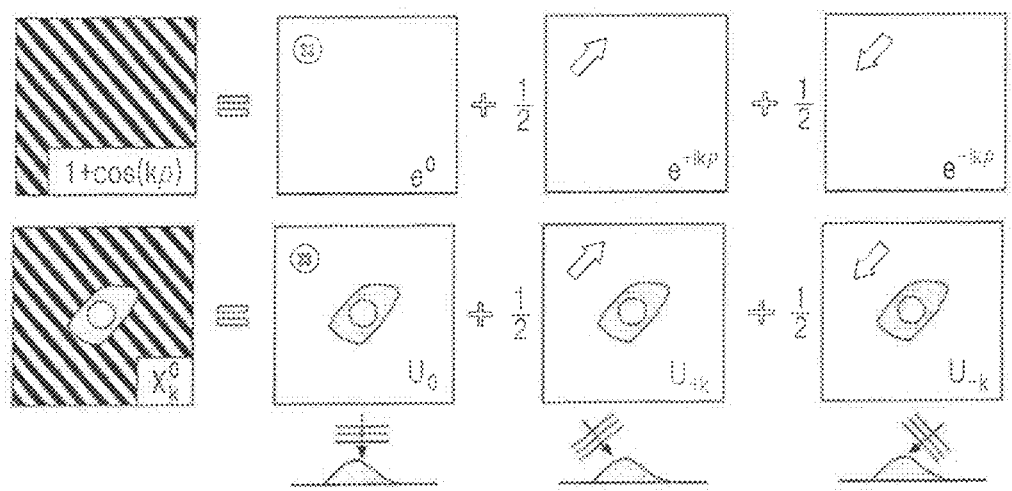
FIG. 5 is a view illustrating linear decomposition of a time-complex structured illumination for optical diffraction tomography according to an embodiment.

FIG. 5 is a view illustrating linear decomposition of a time-complex structured illumination for optical diffraction tomography according to an embodiment. More specifically, FIG. 5a shows a 2D sinusoidal pattern composed of three different plane wave components used in illumination, and FIG. 5b shows a scattering system scattered from the sample.

Referring to FIG. 5, unlike a method using Lee Hologram with a spatial filter, a time-complex structured illumination of a sinusoidal intensity pattern can be used. The sinusoidal intensity pattern can be composed of three plane waves and can be expressed as the following equation.

$$1+\cos(k_P+\varphi)=e^0+\tfrac{1}{2}e^{+ik_P}e^{+i\varphi}+\tfrac{1}{2}e^{-ik_P}e^{-i\varphi} \quad \text{Equation 4}$$

In this case, ρ is a displacement vector on a DMD plane, k is a wave vector that can be related to a spatial period Λ of a sinusoidal pattern as |k|=2π/Λ, and (φ is a phase value with p=0.

When the sample is an illumination having an intensity pattern in Equation 4, as shown in FIG. 1b, a transmitted light field $X_k^\varphi$ may be expressed as the superposition of the scattered fields UK corresponding to a plane wave illumination $e^{ik\rho}$ and can be expressed as following Equation.

$$X_k^\varphi = U_0 + \tfrac{1}{2}U_{+k}e^{+i\varphi} + \tfrac{1}{2}U_{-k}e^{-i\varphi} \quad \text{Equation 5}$$

Equation 5 is a linear equation of three unknown variables (U0, U+k and U−k). Thus, Equation 5 can be solved by measuring at least three times with various phases φ. The phase φ can be controlled simply by shifting the sinusoidal pattern of Equation 4 in the lateral direction.

The following decomposition process can be performed to individually obtain the scattering system Uk. The sinusoidal intensity pattern is a demodulated (normal) illumination or a DC term of Equation 5, where U0 can be measured individually. Then, two additional measurements are performed for each wave k under the condition of φ=0, π/2 to extract U+k and U−k. Thus, the method requires 2N+1 field measurements for N sinusoidal patterns and can be expressed as follows.

$$X_0^0 = 2U_0,$$

$$X_{k_1}^0 = U_0 + \frac{1}{2}U_{+k_1} + \frac{1}{2}U_{-k_1},$$

$$X_{k_1}^{\frac{\pi}{2}} = U_0 + \frac{i}{2}U_{+k_1} - \frac{i}{2}U_{-k_1},$$

$$\vdots$$

$$X_{k_N}^0 = U_0 + \frac{1}{2}U_{+k_N} + \frac{1}{2}U_{-k_N},$$

$$X_{k_N}^{\frac{\pi}{2}} = U_0 + \frac{i}{2}U_{+k_N} - \frac{i}{2}U_{-k_N}.$$

[Equation 6]

In this case, a total of 2N+1 scattering components (U0, U−K1, U−K1, . . . , U−KN) can be obtained.

Figure 6:
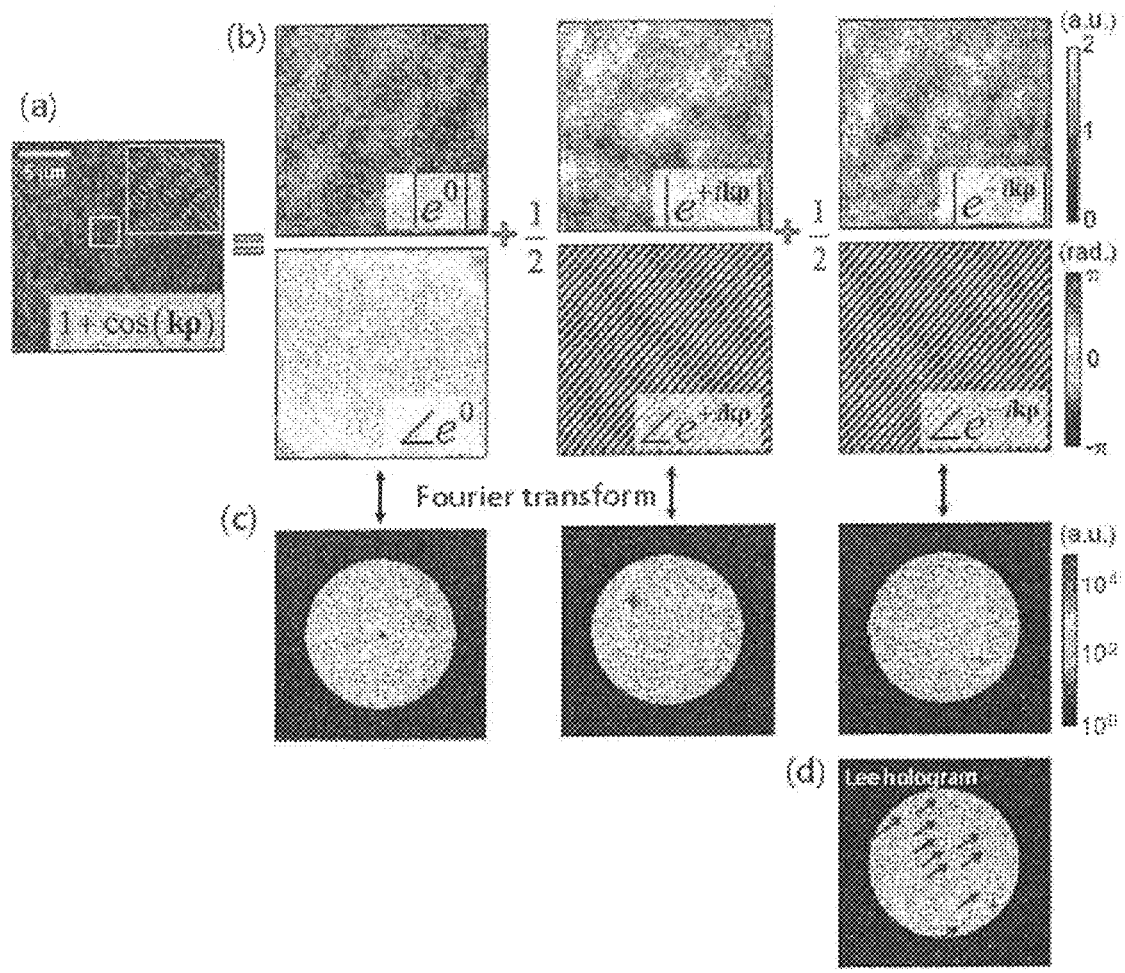
FIG. 6 is a view illustrating an experimental measurement of a time-complex structured illumination according to an embodiment.

FIG. 6 is a view illustrating an experimental measurement of a time-complex structured illumination according to an embodiment.

FIG. 6a shows a measured hologram having a time-complex structured illumination, FIG. 6b shows an amplitude and phase map search after decomposition, FIG. 6c shows a Fourier spectra map clearly representing the spatial frequency components and FIG. 6d shows a Fourier spectra map obtained by a method using Lee Hologram. In this case, several undesired diffraction patterns may occur as indicated by red arrows.

Referring to FIG. 6, a component search for the scattering system can be performed experimentally to verify the validity of the proposed method. From the experimentally measured hologram obtained through the time-complex structured illumination as shown in FIG. 6a, the scattering system can be obtained after decomposition as shown in FIG. 6b. In order to decompose these three scattering systems, three holograms $X_0^0$, $X_k^0$, $X_k^{\pi/2}$ may be measured.

Ideally, it is not necessary to measure more than three times. However, when there is noise due to vibration, more than four measurements may be performed to minimize the effects of noise. In addition, since all the cosine-type structured incident lights include a plane wave component (U0) perpendicular to the sample, when measuring a perpendicular plane wave component by placing the perpendicular plane wave component on the digital micromirror device (DMD), the cosine-type structured incident lights can be divided into individual plane wave components by simply performing the measurement two times while shifting the phase.

Thus, fluorescence images can be obtained by the controlled patterns and ultrahigh-resolution 2D fluorescence images can be reconstructed through an algorithm of the images. In this case, due to the low coherent nature of the fluorescence, a 3D ultrahigh-resolution fluorescence image can be obtained by measuring each part on a z-axis of a cell while moving the stage or lens in the z-axis direction.

Therefore, according to embodiments, a 3D ultrahigh-resolution fluorescence image of a cell can be measured by using the digital micromirror device (DMD) and the laser light source.

Figure 7:
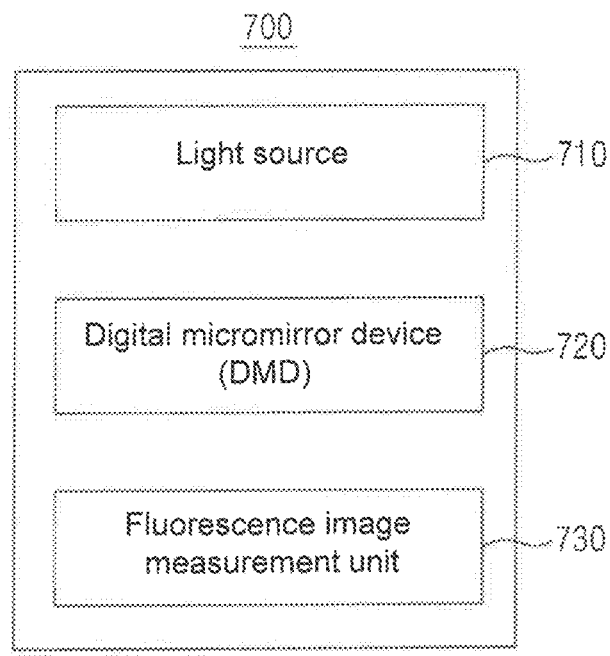
FIG. 7 is a view schematically illustrating the structure of a structured illumination microscopy system using a digital micromirror device and a time-complex structured illumination according to an embodiment.

FIG. 7 is a view schematically illustrating the structure of a structured illumination microscopy system using a digital micromirror device and a time-complex structured illumination according to an embodiment.

Referring to FIG. 7, a structured illumination microscopy system 700 using a digital micromirror device 720 and a time-complex structured illumination according to an embodiment may include a light source 710, the digital micromirror device 720, and a fluorescence image measurement unit 730.

The light source 710 may irradiate the sample with light by irradiating the digital micromirror device 720 with the light. For example, a laser may be used as the light source 710, and the light source 710 may irradiate the sample such as a cell or the like to be measured with a laser beam through the digital micromirror device 720.

The digital micromirror device 720 may adjust the light emitted from the light source 710 and may change at least one of the irradiation angle and the wavefront pattern of the incident light to allow the incident light to enter the sample (specimen). The digital micromirror device 720 can change the light emitted from the light source 710 into a continuous structured incident light. That is, the digital micromirror device 720 may receive the light emitted from the light source 710 and may implement the time-complex structured illumination to cause the controlled structured illumination to enter the sample.

Such a digital micromirror device 720 may provide a controlled time-complex pattern, which can be operated with the light source 710 having a high coherent, to the sample.

The digital micromirror device 720 may implement a time-complex structured illumination of a sinusoidal pattern by adjusting the phase between the plane waves constituting the pattern to obtain an ultrahigh-resolution image by introducing the plane wave into a specific pattern.

The digital micromirror device 720 moves at a predetermined speed for a period of time during which the shutter of the camera is open for measurement to express a bit depth using a time integration method, and performs a 1-bit digital operation to create a structured incident light of a continuous pattern (controlled time-complex pattern).

More specifically, a digital pattern expressed by a bit in the digital micromirror device 720 is divided into a plurality of weighted 1-bit digital patterns, and a weight-reflected time is allocated to each of a plurality of 1-bit digital patterns for a period of time during which the shutter of the camera is open and then the time is summed up to produce continuous structured incident light.

Hereinafter, a technology for implementing a continuous pattern by only a 1-bit digital operation of the digital micromirror device 720 using the time integration method will be described in more detail.

In one embodiment, the time integration can express a deeper bit depth by rapidly moving the digital micromirror device 720 for a period of time during which the shutter of the camera is open. For example, the procedure for expressing an 8-bit digital pattern using the time integration can be represented as follows.

Figure 9:
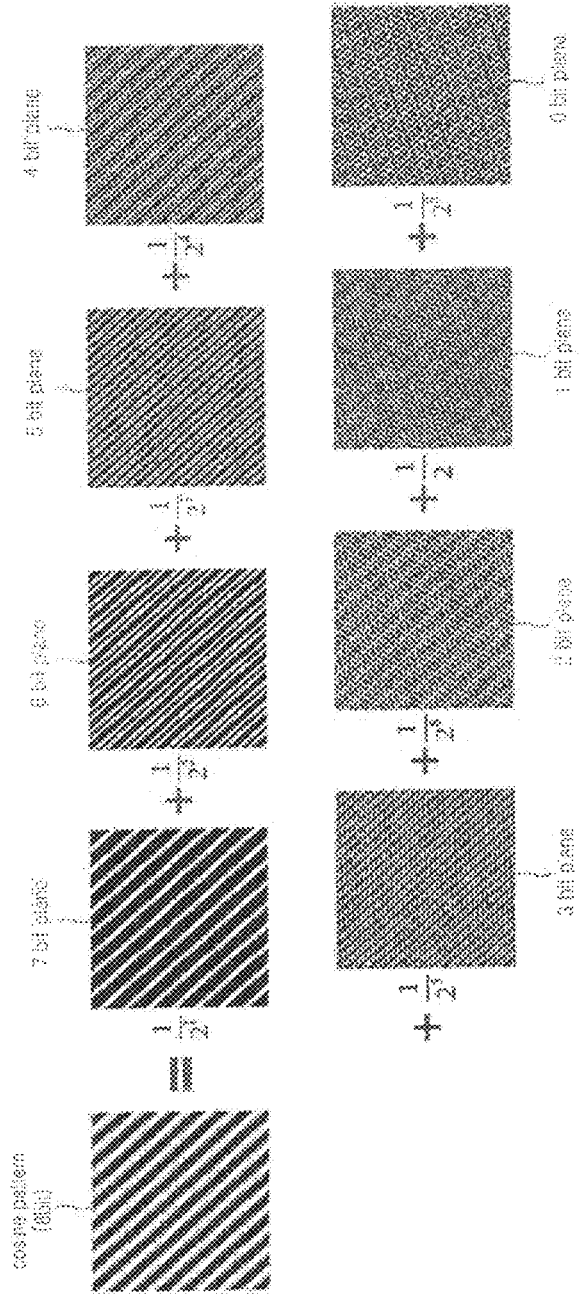
FIG. 9 is a view illustrating a method of expressing an 8-bit digital pattern using time integration according to an embodiment.

FIG. 9 is a view illustrating a method of expressing an 8-bit digital pattern using the time integration according to an embodiment. Referring to FIGS. 7 and 9, an 8-bit digital pattern can be divided into eight 1-bit digital patterns having weights ranging from 20 to 27 in the digital micromirror device (DMD) 720. In this case, a 1-bit digital pattern with a weight of 2n is called an n-bit plane (n=0, 1, ?, 7).

Figure 10:
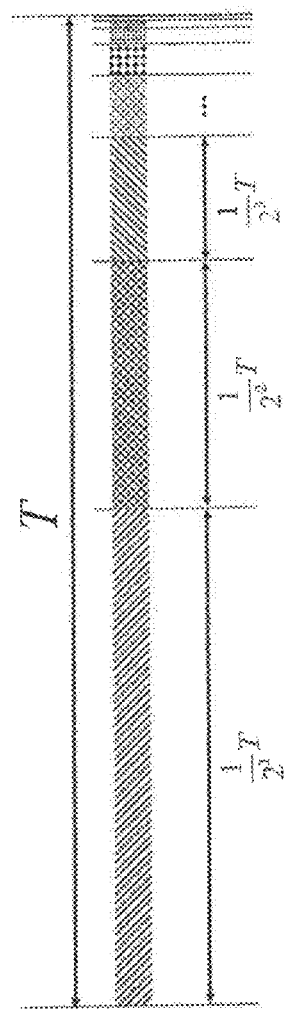
FIG. 10 is a view for describing a method of allocating time to each divided digital pattern and summing up the time according to an embodiment.

FIG. 10 is a view for describing a method of allocating time to each divided digital pattern and summing up the time according to an embodiment. Referring to FIGS. 7, 9 and 10, when the time during which the shutter of the camera is open is T, each n-bit plane can be displayed on the digital micromirror device 720 for a period of time $(2^{n-1})T$. In this case, the shutter of the camera is kept open. Thus, each bit plane is weighted by the time for displaying the n-bit plane on the digital micromirror device 720, so that an 8-bit digital pattern can be generated.

The continuous pattern generation using the time integration method may be utilized for a projector using the digital micromirror device 720. Furthermore, the continuous pattern generation using the time integration method may be used to measure high-resolution 3D fluorescence images through structured incident light.

Meanwhile, after producing the structured incident light, a holographic image photographed in a continuous pattern structured incident light may be preprocessed to obtain a 3D refractive index image. The structured incident light is expressed as a cosine pattern, and the structured incident light of the cosine pattern is divided into a plurality of plane waves and passes through the sample to measure a holographic image through the interferometer. In order to discriminate the result induced from each plane wave, a plurality of different measurements may be performed.

In this case, in order to obtain different measurements on the structured incident light of the cosine pattern having the same period, the measurement may be performed while phase-shifting the cosine pattern on the digital micromirror device 720.

In other words, the digital micromirror device 720 controls the phase or pattern of the wavefront of the plane wave incident from the light source 710, so that the fluorescence image measurement unit 730 can obtain a plurality of fluorescence images as the phase or pattern of the wavefront of the plane wave is controlled, thereby obtaining a high-resolution 3D fluorescence image.

Meanwhile, the interferometer extracts an interference signal from at least one incident light and measures the 2D optical field passing through the sample according to at least one incident light. Thus, in the holographic imaging system using the interferometer, a 3D optical tomography method can be realized by utilizing the continuous cosine-type structured incident light.

When a plane wave component perpendicular to the sample is measured by the digital micromirror device 720, the structured incident light of the cosine pattern includes a plane wave component perpendicular to the sample, and the structured incident light of the cosine pattern can be divided into plane wave components by measuring the pattern while shifting the phase two times.

The fluorescence image measurement unit 730 may extract a high-resolution 3D fluorescence image of the sample. In this case, a camera or the like may be used to measure the fluorescence image. The fluorescence image measurement unit 730 obtains a plurality of fluorescence images by the controlled patterns, reconstructs an ultrahigh resolution 2D fluorescence image through an algorithm of the fluorescence images, moves the stage or the lens in the z-axis direction based on the low coherent nature of the fluorescence, and measures each part on a z-axis of the sample, thereby acquiring a high-resolution 3D fluorescence image.

Further, a 3D refractive index image or a scattering potential may be obtained through the camera by allowing the structured incident light to pass through the sample. In this case, the scattering potential is expressed by the refractive index, the absorption coefficient and the like according to the reaction between the used light and the specimen. Since the 3D refractive index image can be obtained through information of the measured 2D optical field, it is possible to measure the 3D refractive index at the high speed and high precision.

Figure 8:
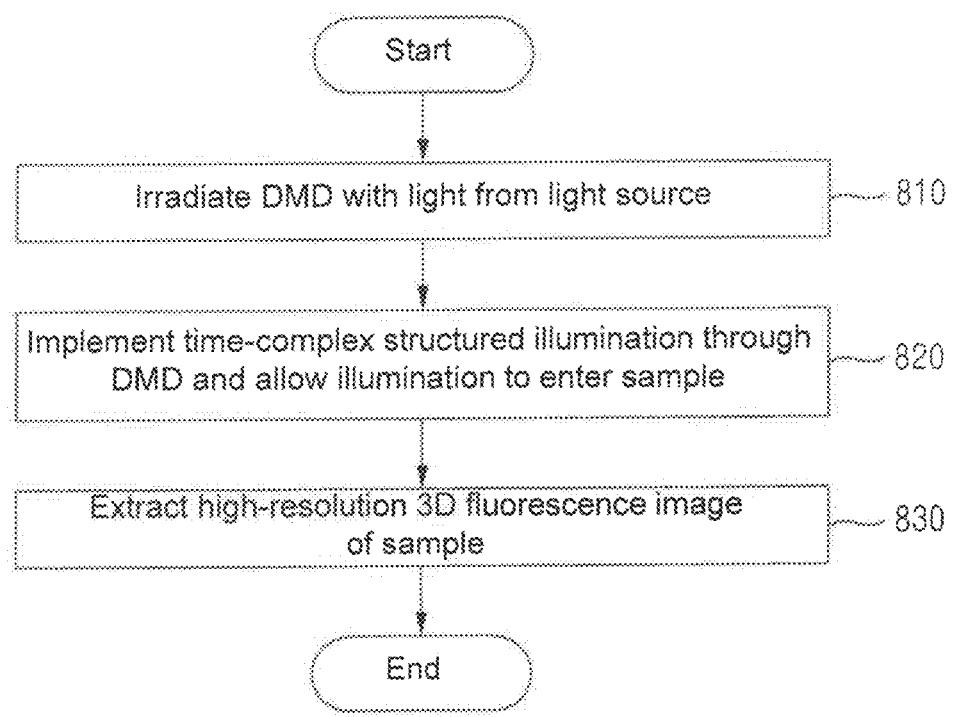
FIG. 8 is a flowchart illustrating an operation method of a structured illumination microscopy system using a digital micromirror device and a time-complex structured illumination according to an embodiment.

FIG. 8 is a flowchart illustrating an operation method of a structured illumination microscopy system using a digital micromirror device and a time-complex structured illumination according to an embodiment.

Referring to FIG. 8, a method of operating a structured illumination microscopy system using a digital micromirror device and a time-complex structured illumination according to an exemplary embodiment includes a step (810) of illuminating a digital micromirror device (DMD) with a light, a step (820) of implementing a time-complex structured illumination through the digital micromirror device to cause the controlled structured illumination to enter the sample, and a step (830) of extracting a high resolution 3D fluorescence image of the sample.

The step (830) of extracting the high-resolution 3D fluorescence image of the sample includes a step (831) of obtaining a plurality of fluorescence images by the controlled patterns, a step (832) of reconstructing an ultrahigh-resolution 2D fluorescence image through an algorithm of a plurality of fluorescence images; and a step (833) of moving a stage or a lens in the z-axis direction using the low coherent nature of the fluorescence and measuring each part on a z-axis of the sample to obtain a high resolution 3D fluorescence image.

Hereinafter, an example of an operation method of a structured illumination microscopy system using a digital micromirror device and a time-complex structured illumination according to an embodiment will be described in more detail.

The operation method of the structured illumination microscopy system using the digital micromirror device and the time-complex structured illumination according to an embodiment may be described in more detail with reference to the structured illumination microscopy system using the digital micromirror device and the time-complex structured illumination according to the embodiment described with reference to FIG. 7. The structured illumination microscopy system using the digital micromirror device and the time-complex structured illumination according to an embodiment may include a light source, a digital micromirror device, and a fluorescence image measurement unit.

In step (810), the light source may irradiate the digital micromirror device (DMD) with the light. The light source may be a laser for irradiating a laser beam.

In step (820), the time-complex structured illumination may be implemented through the digital micromirror device to cause the controlled structured illumination to enter the sample.

Such a digital micromirror device may provide a controlled time-complex pattern, which can be operated with the light source having a high coherent, to the sample. The digital micromirror device may implement a time-complex structured illumination of a sinusoidal pattern by adjusting the phase between the plane waves constituting the pattern to obtain an ultrahigh-resolution image by introducing the plane wave into a specific pattern.

The digital micromirror device moves at a predetermined speed for a period of time during which the shutter of the camera is open for measurement to express a bit depth using a time integration method, and performs a 1-bit digital operation to create a structured incident light of a continuous pattern (controlled time-complex pattern).

More specifically, a digital pattern expressed by a bit in the digital micromirror device is divided into a plurality of weighted 1-bit digital patterns, and a weight-reflected time is allocated to each of a plurality of 1-bit digital patterns for a period of time during which the shutter of the camera is open and then the time is summed up to produce continuous structured incident light.

The digital micromirror device controls the phase or pattern of the wavefront of the plane wave incident from the light source so that the fluorescence image measurement unit can obtain a plurality of fluorescence images as the phase or pattern of the wavefront of the plane wave is controlled, thereby obtaining a high-resolution 3D fluorescence image.

In step (830), a high-resolution 3D fluorescence image of the sample can be extracted.

The fluorescence image measurement unit may extract a high-resolution 3D fluorescence image of the sample. The fluorescence image measurement unit obtains a plurality of fluorescence images by the controlled patterns, reconstructs an ultrahigh resolution 2D fluorescence image through an algorithm of the fluorescence images, moves the stage or the lens in the z-axis direction based on the low coherent nature of the fluorescence, and measures each part on a z-axis of the sample, thereby acquiring a high-resolution 3D fluorescence image.

According to embodiments, it is possible to provide a structured illumination microscopy system using a digital micromirror device (DMD) and a time-complex structured illumination, and an operation method therefor, capable of implementing the time-complex structured illumination by using the digital micromirror device and extracting a high-resolution 3D fluorescence image by using the time-complex structured illumination.

Figure 11:
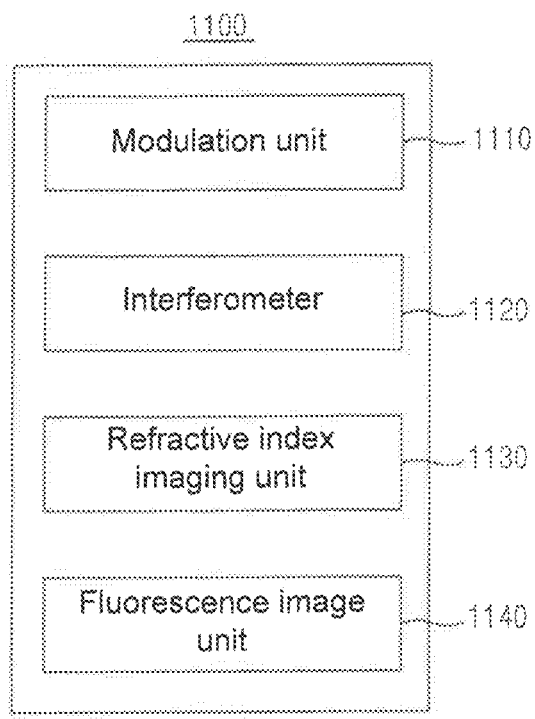
FIG. 11 is a block diagram illustrating an ultrahigh-speed 3D refractive index tomography and fluorescence structured illumination microscopy system using a wavefront shaper according to another embodiment.

FIG. 11 is a block diagram illustrating an ultrahigh-speed 3D refractive index tomography and fluorescence structured illumination microscopy system using a wavefront shaper according to another embodiment.

Referring to FIG. 11, the ultrahigh-speed 3D refractive index tomography and fluorescence structured illumination microscopy system 1100 using the wavefront shaper according to another embodiment may include a modulation unit 1110, an interferometer 1120, and a refractive index imaging unit 1130. According to embodiments, the ultrahigh-speed 3D refractive index tomography and fluorescence structured illumination microscopy system 1100 using the wavefront shaper may further include a fluorescence image unit 1140.

Figure 12:
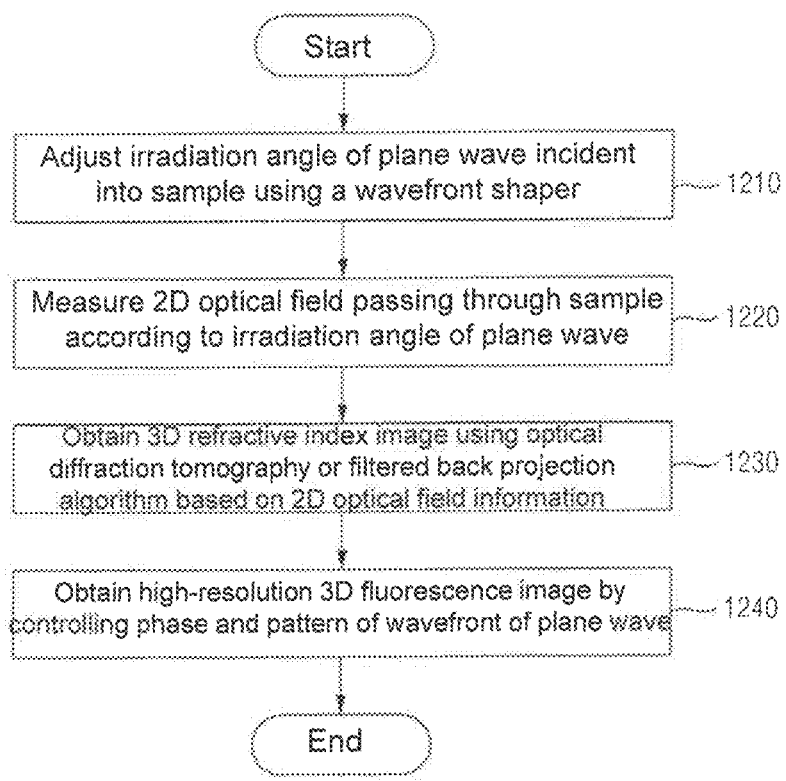
FIG. 12 is a flowchart illustrating a method of using an ultrahigh-speed 3D refractive index tomography and fluorescence structured illumination microscopy system using a wavefront shaper according to another embodiment.

FIG. 12 is a flowchart illustrating a method of using the ultrahigh-speed 3D refractive index tomography and fluorescence structured illumination microscopy system using a wavefront shaper according to another embodiment.

Referring to FIG. 12, the method of using the ultrahigh-speed 3D refractive index tomography and fluorescence structured illumination microscopy system using the wavefront shaper according to another embodiment includes a step (1210) of adjusting an irradiation angle of a plane wave incident onto a sample by using a wavefront shaper, a step (1220) of measuring a 2D optical field having passed through the sample according to the irradiation angle of the plane wave, and a step (1230) of acquiring a 3D refractive index image by using an optical diffraction tomography or a filtered back projection algorithm based on information of the measured 2D optical field. In addition, the method may further include a step (1240) of acquiring a 3D high-resolution fluorescence image by controlling the phase and pattern of the wavefront of the plane wave.

Accordingly, the 3D high-resolution fluorescence image and the 3D refractive index stereoscopic image of the sample can be simultaneously measured by using the wavefront shaper.

The method of using the ultrahigh-speed 3D refractive index tomography and fluorescence structured illumination microscopy system using the wavefront shaper according to another embodiment can be described in more detail with reference to the ultrahigh-speed 3D refractive index tomography and fluorescence structured illumination microscopy system using the wavefront shaper according to one embodiment, which is described with reference to FIG. 11.

In step (1210), the modulation unit 1110 may adjust the irradiation angle of the plane wave incident onto the sample by using the wavefront shaper. For example, the wavefront shaper may include a digital micromirror device or the like. That is, the modulation unit 1110 can form plane waves having various progression angles by changing a pattern to be displayed on the digital micromirror device so as to control the progression angle of the plane wave incident onto the sample.

In addition, the modulation unit 1110 may adjust the irradiation angle of the plane wave to cause the diffractive light to be incident onto the sample, control the progression direction of one plane wave by shielding other plane waves, and adjust the pattern of the digital micromirror device to obtain desired phase information. In this case, the modulation unit 1110 may use a spatial filter to adopt only one specific diffractive light from among the diffractive lights generated by the digital micromirror device.

In step (1220), the interferometer 1120 may measure the 2D optical field passing through the sample according to the irradiation angle of the plane wave. More specifically, the interferometer 1120 may measure the 2D optical field by making an interferometer of the 2D optical field and a reference beam passing through the sample and variously changing the irradiation angle of the plane wave.

In step (1230), the refractive index imaging unit 1130 may obtain a 3D refractive index image by using an optical diffraction tomography or a filtered back projection algorithm based on information of the measured 2D optical field.

In step (1240), the fluorescence image unit 1140 may acquire a 3D high-resolution fluorescence image by controlling the phase and pattern of the wavefront of the plane wave. Accordingly, the 3D high-resolution fluorescence image and the 3D refractive index stereoscopic image of the sample can be simultaneously measured by using the wavefront shaper.

More specifically, the fluorescence image unit 1140 allows the plane wave to enter a specific pattern, adjusts the phase between the plane waves constituting the pattern to obtain the fluorescence image by the controlled patterns, and reconstructs the high-resolution 2D fluorescence image through the algorithm of a plurality of fluorescence images to obtain a 3D high-resolution fluorescence image.

The fluorescence image unit 1140 may form N*M patterns including N patterns for distinguishing optical fields which can be adjusted in angle and phase through a pattern of the digital micromirror device and M patterns for azimuthal angle scanning.

Meanwhile, a specific portion on the z-axis of the light source that generates the plane wave can be measured by using a low coherent light. In other words, the fluorescence image unit 1140 may obtain a 3D fluorescence image through the optical sectioning using a digital micromirror device, which is a kind of a diffraction lattice or a wavefront shaper, based on the patterned low coherent light and the z-axis shift stage.

The fluorescence image unit 1140 may obtain the 3D high-resolution fluorescence image by moving a stage or a condenser lens in the z-axis direction to measure each portion on a z-axis of the sample.

According to embodiments, both the 3D ultrahigh-resolution fluorescence image and the 3D refractive index distribution image of a living cell can be simultaneously measured in one system. This technology makes it possible to distinctly measure the specific structure based on the 3D protein distribution inside the cell and the 3D ultrahigh-resolution fluorescence image. In addition, structural and biochemical changes over time can also be measured by measuring the cellular internal structure for a long period of time.

Figure 13:
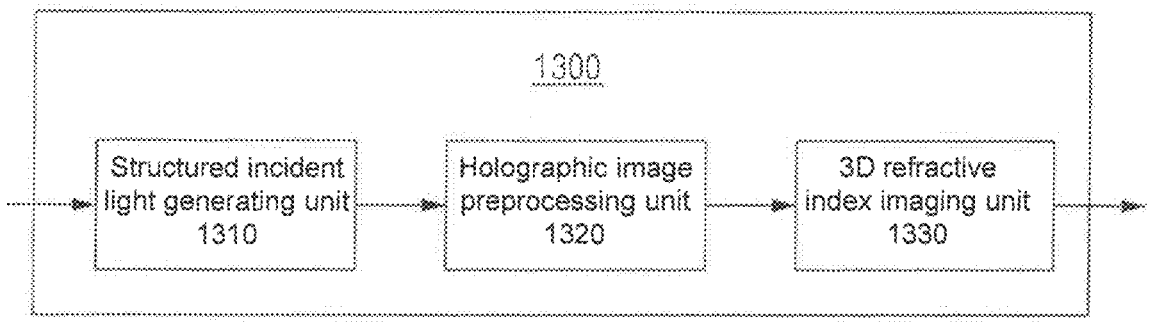
FIG. 13 is a view for schematically describing a structured incident 3D refractive index tomography apparatus utilizing a digital micromirror device according to another embodiment.

FIG. 13 is a view for schematically describing a structured incident 3D refractive index tomography apparatus utilizing a digital micromirror device according to another embodiment.

Referring to FIG. 13, a structured incident 3D refractive tomography apparatus 1300 using a digital micromirror device according to another embodiment includes a structured incident light generating unit 1310, a holographic image preprocessing unit 1320, and a 3D refractive index imaging unit 1330.

Figure 14:
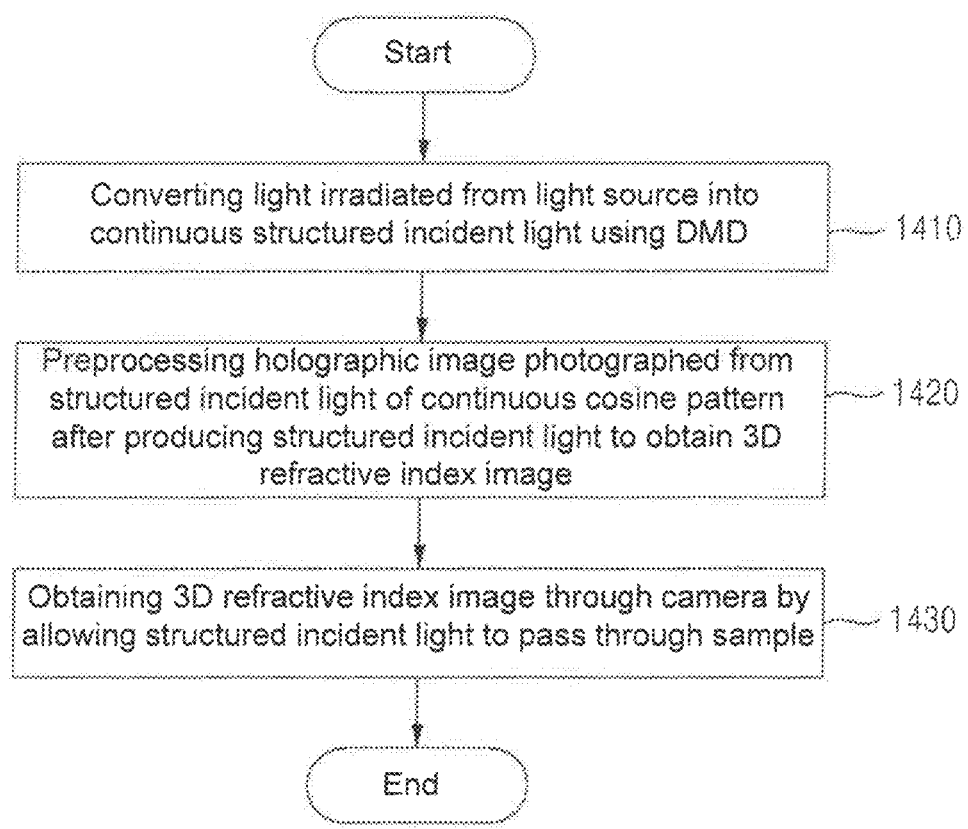
FIG. 14 is a flowchart illustrating a method of using a structured incident 3D refractive index tomography apparatus utilizing a digital micromirror device according to another embodiment.

FIG. 14 is a flowchart illustrating a method of using a structured incident 3D refractive index tomography apparatus utilizing a digital micromirror device according to another embodiment.

Referring to FIG. 14, the method of using the structure-based 3D refractive index tomography method using the digital micromirror device according to another embodiment may include a step (1410) of converting light irradiated from a light source into a continuous structured incident light using a digital micromirror device, and a step (1430) of obtaining a 3D refractive index image through a camera by allowing the structured incident light to pass through a sample.

In addition, the method may further include a step (1420) of preprocessing a holographic image photographed from the structured incident light of a continuous cosine pattern after producing the structured incident light to obtain a 3D refractive index image.

According to embodiments, the 3D optical tomography method using the digital micromirror device may provide a structured incident light by utilizing a time integration method so that a variety of accurate incident lights can be generated without noise. In addition, the continuous structured light having deeper bits can be generated by utilizing the digital micromirror device, thereby acquiring a tomographic image having an improved quality.

The method of using the structured incident 3D refractive index tomography using the digital micromirror device according to another embodiment may be described in more detail with reference to the structured incident 3D refractive index tomography apparatus using the digital micromirror device according to another embodiment which is described with reference to FIG. 13.

In step (1410), the structured incident light generating unit 1310 may change at least one of the incident angle and the wavefront pattern of the incident light by using the digital micromirror device to allow the incident light to enter the sample.

The structured incident light generating unit 1310 can convert the light irradiated from the light source into a continuous structured incident light by using the digital micromirror device.

The structured incident light generating unit 1310 moves the digital micromirror at a predetermined speed for a period of time during which the shutter of the camera is open for measurement to express a bit depth using a time integration method, and produces the structured incident light of a continuous pattern through a 1-bit digital operation.

The structured incident light generating unit 1310 may divide a digital pattern expressed by a bit in the digital micromirror device into a plurality of weighted 1-bit digital patterns. Then, the structured incident light generating unit 1310 may allocate a weight-reflected time to each of the plurality of 1-bit digital patterns for a period of time during which the shutter of the camera is open, and sum up the time to produce the continuous structured incident light.

In step (1420), the holographic image preprocessing unit 1320 produces the structured incident light and preprocesses the holographic image photographed from the structured incident light of a continuous cosine pattern to obtain a 3D refractive index image.

The holographic image preprocessing unit 1320 may express the structured incident light in a cosine pattern, and then divide the structured incident light of the cosine pattern into a plurality of plane waves. Then, the holographic image preprocessing unit 1320 allows the structured incident light of the cosine pattern to pass through the sample to measure the holographic image through the interferometer. In order to discriminate the result induced from each plane wave, a plurality of different measurements may be performed.

In this case, in order to obtain different measurements on the structured incident light of the cosine pattern having the same period, the measurement may be performed while phase-shifting the cosine pattern on the digital micromirror device.

When a plane wave component perpendicular to a sample is measured by a digital micromirror device in the holographic image preprocessing unit 1320, the structured incident light of the cosine pattern includes a plane wave component perpendicular to the sample, and the structured incident light of the cosine pattern can be divided into plane wave components by measuring the pattern while shifting the phase two times.

In step (1430), the 3D refractive index imaging unit 1330 may allow the structured incident light to pass through the sample to obtain a 3D refractive index image or a scattering potential through a camera.

Figure 15:
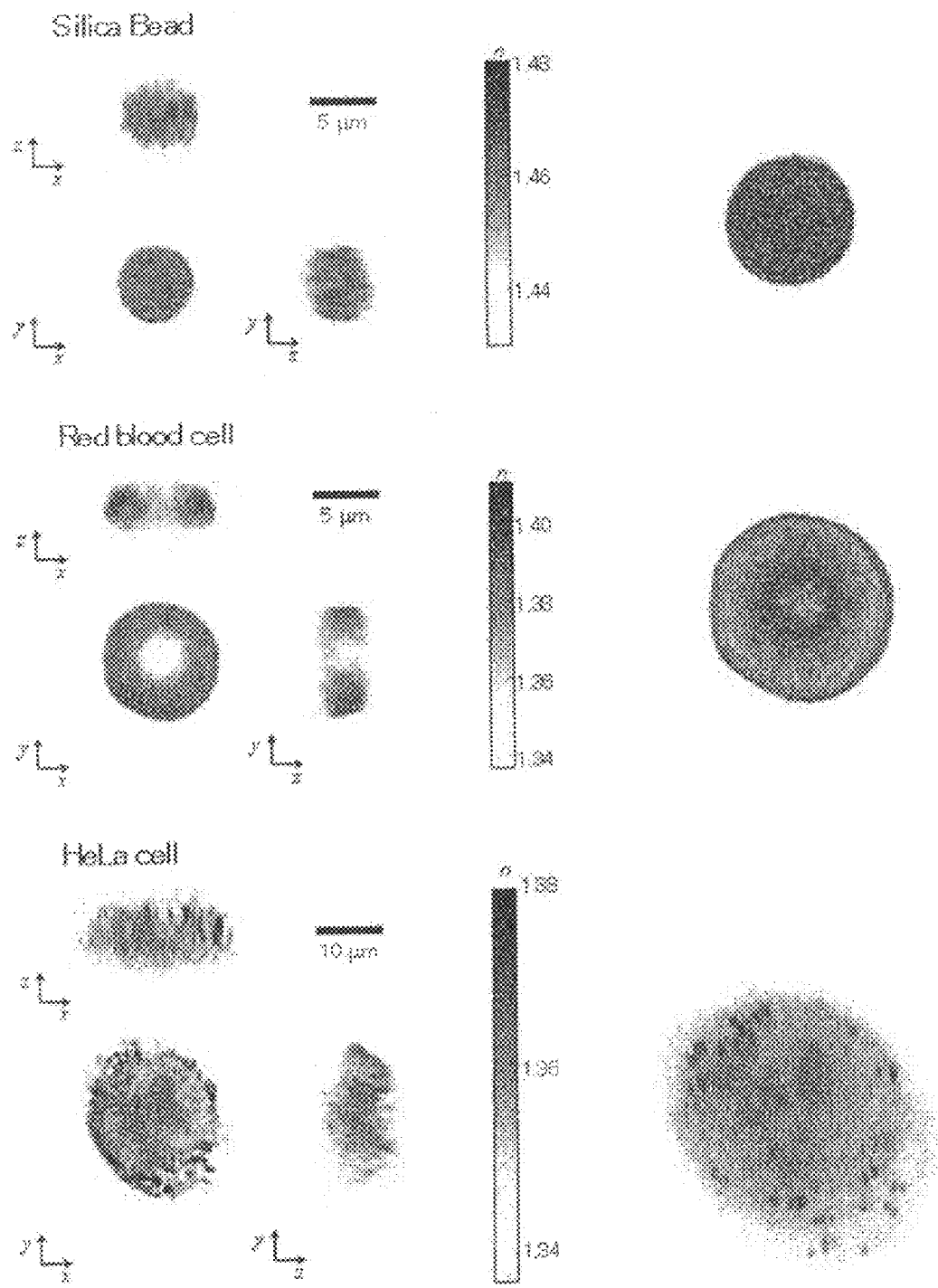
FIG. 15 is view showing examples of 3D tomographic images for various specimens according to another embodiment.

FIG. 15 is view showing examples of 3D tomographic images for various specimens according to another embodiment.

FIG. 15 shows 3D refractive index tomographic images of various samples (silica microspheres, human red blood cells, HeLa, etc.) measured by a structure incident 3D refractive index tomography apparatus and a method using a digital micromirror device according to another embodiment described above.

An ultrahigh-speed incident light control method using a wavefront shaper such as a deformable mirror (DM) or a digital micromirror device (DMD) can be stably and rapidly operated as compared with a conventional galvanometer mirror, a mechanical specimen, or a movement of a light source so that this technique can be applied to the production of products using the optical tomography.

According to embodiments, the continuous structured light having deeper bits can be generated by using the digital micromirror device so that undesired noise information, which generates when using the conventional on/off 1-bit hologram (for example, Lee hologram) or a super-pixel method, can be removed and more various and accurate incident lights can be generated. As a result, a 3D tomographic image having the improved quality can be obtained.

In addition, while the camera shutter is being open, the digital micromirror quickly moves to express a deeper bit, so the speed may be limited compared to the case where a single measurement is made per one pattern placed on a digital micromirror. In most cases, however, the speed of the digital micromirror is much faster than the frame rate of the camera, so both cases may adopt the same frame rate of the camera, thus, the speed of generating the 3D image is the same.

MODE FOR INVENTION

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

The invention claimed is:

1. A microscopy system, comprising:
a digital micromirror device (DMD) configured to receive light and to implement a time-complex structured illumination to cause a controlled structured illumination to enter a sample, wherein the DMD is configured to control and change a phase or a pattern of the time-complex structured illumination, wherein the DMD is:
movable at a predetermined speed to control and change the phase or the pattern of the time-complex structured illumination when a shutter of a camera is open for measurement to express a bit depth via a time integration method; and
configured to implement a controlled time-complex structured illumination of continuous patterns via 1-bit digital operation; and
a fluorescence image measurement unit configured to extract a high-resolution 3D fluorescence image of the sample, wherein extracting the high-resolution 3D fluorescence image of the sample comprises acquiring a plurality of fluorescence images of the sample while the phase or the pattern of the time-complex structured illumination is being controlled and changed by the DMD.

2. The microscopy system of claim 1, further comprising a light source configured to provide the light.

3. The microscopy system of claim 2, wherein the light source comprises a laser configured to emit a laser beam.

4. The microscopy system of claim 3, wherein the DMD is configured to operate with the laser beam to provide a time-complex pattern to the sample.

5. The microscopy system of claim 1, wherein the DMD is configured to control and change the phase or the pattern of the time-complex structured illumination by:
introducing a plane wave into a specific pattern; and
adjusting a phase between plane waves constituting the pattern to implement time-complex structured illumination of a sinusoidal pattern.

6. The microscopy system of claim 1, wherein the DMD is configured to operate with a high coherent light source to provide a time-complex pattern to the sample.

7. The microscopy system of claim 6, wherein the DMD is configured to:
introduce a plane wave into a specific pattern; and
adjust a phase between plane waves constituting the pattern to implement a time-complex structured illumination of a sinusoidal pattern to obtain an ultrahigh-resolution image.

8. The microscopy system of claim 1, wherein extracting the high-resolution 3D fluorescence image of the sample further comprises:
reconstructing an ultrahigh-resolution 2D fluorescence image via an algorithm operating on the plurality of fluorescence images;
moving a stage or a lens in a z-axis direction via a low coherent characteristic of fluorescence; and
measuring each part on a z-axis of the sample to obtain the high-resolution 3D image.

9. The microscopy system of claim 1, wherein the fluorescence image measurement unit is configured to:
reconstruct an ultrahigh-resolution 2D fluorescence image via an algorithm operating on the plurality of fluorescence images.

10. The microscopy system of claim 9, wherein the fluorescence image measurement unit is configured to move a stage or a lens in a z-axis direction via a low coherent characteristic of fluorescence.

11. A method, comprising:
using the system of claim 1 to provide a high-resolution 3D fluorescence image of a sample.

12. A method, comprising:
irradiating a digital micromirror device (DMD) with light;
using the DMD to implement a time-complex structured illumination to cause a controlled structured illumination to enter a sample, wherein the DMD is configured to control and change a phase or a pattern of the time-complex structured illumination, comprising:
expressing a bit depth using a time integration method by moving the DMD at a predetermined speed to control and change the phase or the pattern of the time-complex structured illumination when a shutter of a camera is open for measurement; and
implementing a controlled time-complex structured illumination of continuous patterns through 1-bit digital operation; and
extracting a high-resolution 3D fluorescence image of the sample, wherein extracting the high-resolution 3D fluorescence image of the sample comprises acquiring a plurality of fluorescence images of the sample while the phase or the pattern of the time-complex structured illumination is being controlled and changed by the DMD.

13. The method of claim 12, wherein the light comprises laser light.

14. The method of claim 12, further comprising using the DMD to provide a time-complex pattern to the sample.

15. The method of claim 12, wherein controlling and changing the phase or the pattern of the time-complex structured illumination further comprises:
   introducing a plane wave into a specific pattern; and
   adjusting a phase between plane waves constituting the pattern, thereby implementing a time-complex structured illumination of a sinusoidal pattern.

16. The method of claim 12, wherein extracting the high-resolution 3D fluorescence image of the sample further comprises:
   reconstructing an ultrahigh-resolution 2D fluorescence image through an algorithm operating on the plurality of fluorescence images; and
   moving a stage or a lens in a z-axis direction by using a low coherent characteristic of fluorescence, and obtaining the high-resolution 3D image by measuring each part on a z-axis of the sample.

* * * * *